C. A. ANDERSSON.
PLOW.
APPLICATION FILED JUNE 29, 1911.
1,033,368.
Patented July 23, 1912.
3 SHEETS—SHEET 2.
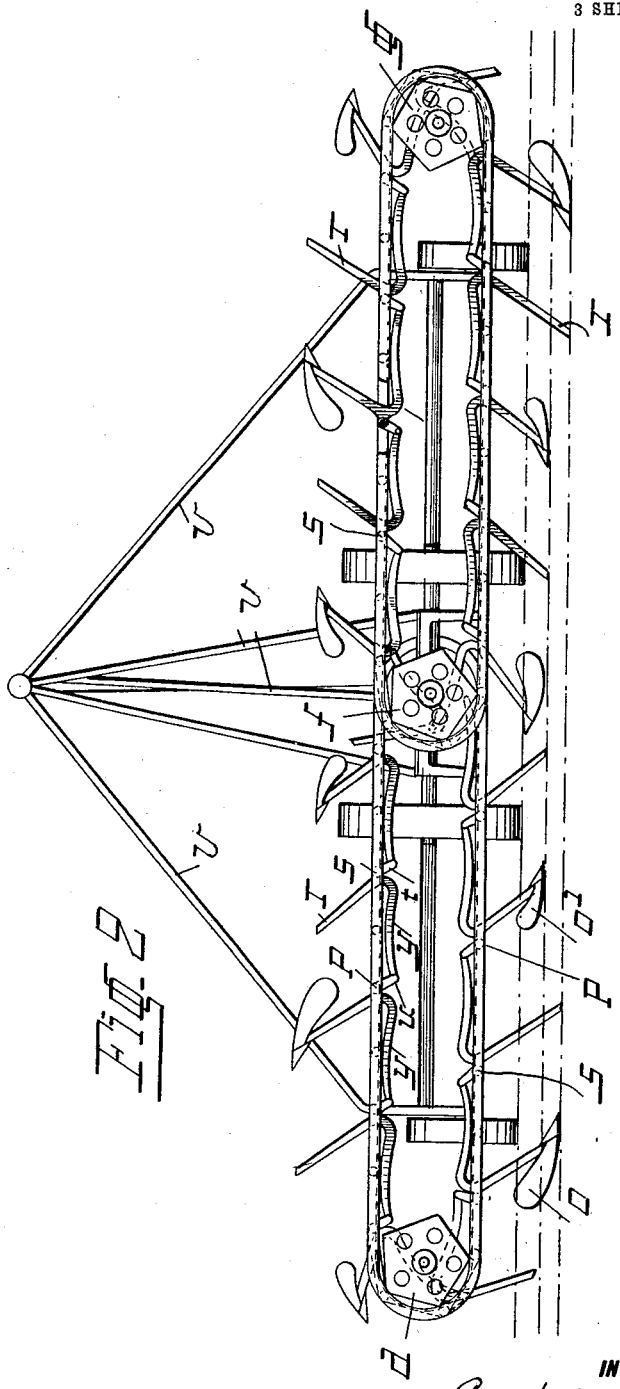

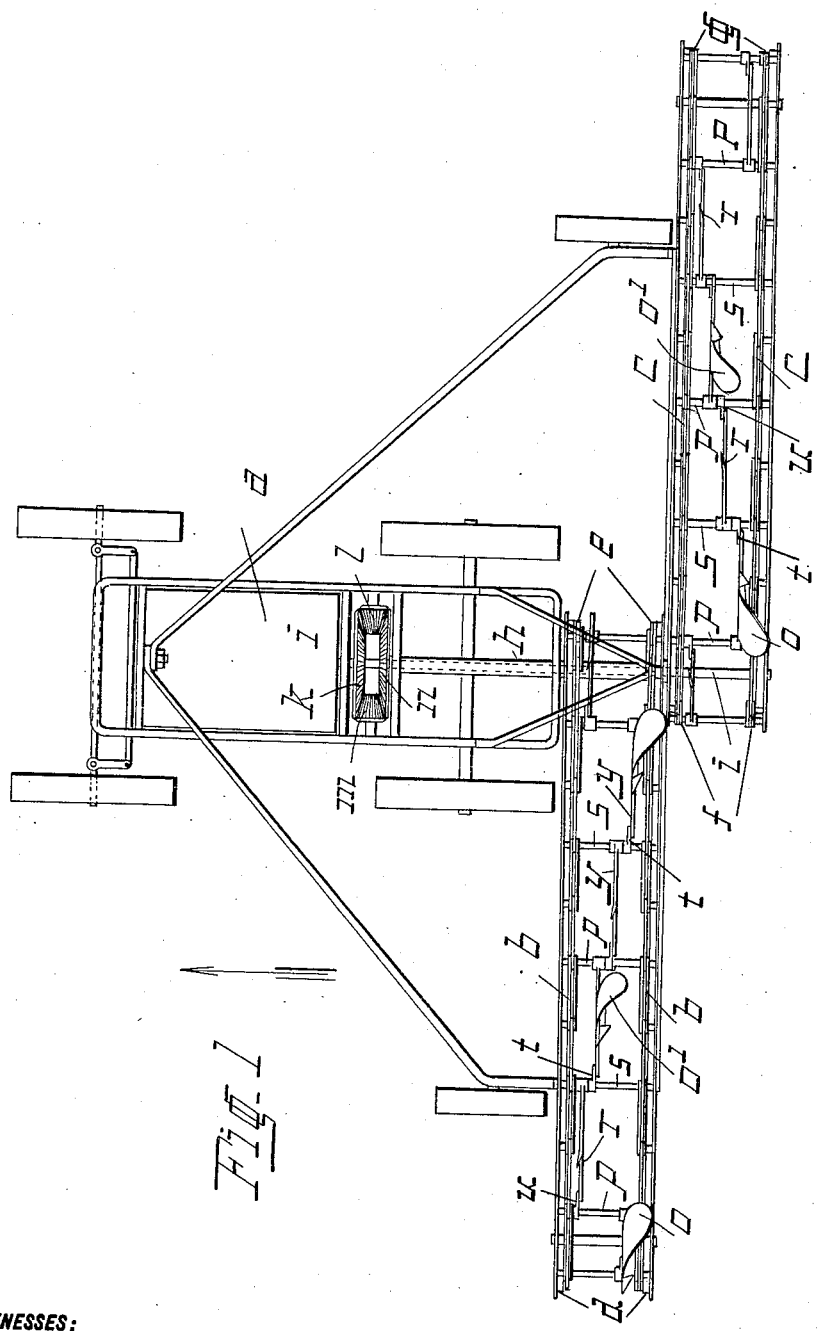

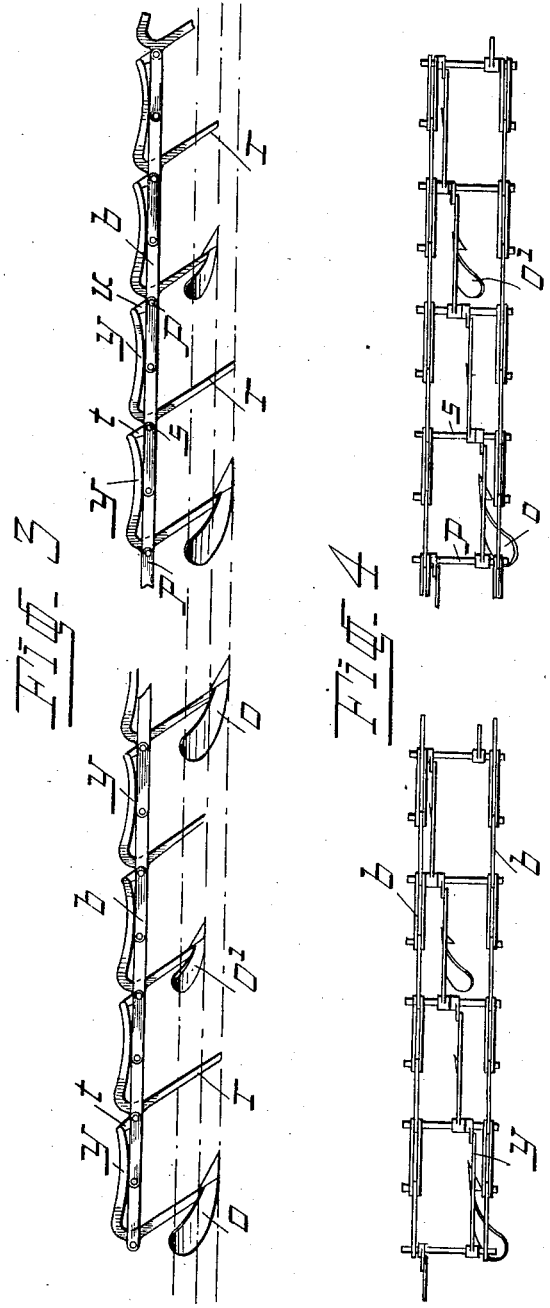

UNITED STATES PATENT OFFICE.

CARL ARVID ANDERSSON, OF BRONÄS, SWEDEN.

PLOW.

1,033,368.

Specification of Letters Patent.

Patented July 23, 1912.

Application filed June 29, 1911. Serial No. 636,117.

*To all whom it may concern:*

Be it known that I, CARL ARVID ANDERSSON, engineer, a citizen of Sweden, and a subject of the King of Sweden, residing at Bronäs, in the Kingdom of Sweden, have invented certain new and useful Improvements in Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to such power plows, as consist of two oppositely working systems of plow shares carried by a portable engine or any other suitable driving motor and being arranged on endless chains, driving bands or the like, running over wheels and driven from the engine and having a knife or colter of known kind in front of each plow-share.

The invention is substantially characterized by the plow shares in each system being arranged in two or more series in such manner that the shares in each series are displaced a little laterally in relation to each other, and that each of the shares in one series is placed straight behind the corresponding share in the other series.

Another feature of the invention consists of certain means for supporting the shares and the colters.

In the accompanying drawing an embodiment of the invention is diagrammatically shown in Figure 1 in plan, and in Fig. 2 in elevation. Figs. 3 and 4 respectively show an elevation and plan of a set of chains stretched out straight and with the shares secured thereto.

$a$ is a portable driving motor for driving two pairs of horizontally arranged endless chain belts $b$ and $c$, said chains being brought over wheels $d$ $e$ $f$ and $g$, of which $e$ and $f$ are connected with the motor by means of their shafts $h$ and $i$ respectively. As shown on the drawing, the one shaft $h$ is hollow and the other one $i$ is passing through the hollow shaft.

Each pair of chains carries one or more series of plow-shares $o$, $o'$ of known kind placed at a suitable distance apart, said plow-shares being secured on transverse bolts $p$ pivotally secured to the chains $b$ and $c$. In front of each plow-share there is arranged a colter $r$ of the same kind as employed in ordinary plows, said colter being also carried by transverse bolts or pivots $s$. As the chains are arranged to be driven in opposite directions the plow-shares on the one chain are turned in opposite direction to the shares on the other chain. Preferably the shares are arranged in such a way that on being brought through the ground the shares of the one pair of chains will move toward the shares of the other pair.

In order to make it possible to plow several furrows at a time with each system of shares the shares in each system are arranged in two or more series. The shares in each series are displaced laterally with relation to each other, and each of the shares in one series is arranged straight behind the corresponding share in the preceding series. Each series consists partly of a fore share $o'$ and a rear share $o$ with their respective colters, the former share being shorter than the other, so that the two shares cut to different depths.

As during plowing the shares cut forward at oblique angles to the direction of movement of the chains on account of the apparatus being driven forward in a certain relation to the movement of the chains the two shares in each series will cut in the same furrow in view of the lateral displacement of the shares above referred to, while the several series each will cut a separate furrow. As the fore share $o'$ cuts less deep than the rear share $o$ in each series the strain on each individual share will be lessened materially.

One of the shafts, preferably the inner one $i$ is driven directly from the motor and transfers its movement to the outer shaft by means of four bevel gear wheels $k$, $l$, $m$, $n$.

In order to support the shares and the colters, so that they will not change their position during the work, an arm $y$ on each one is connected, by means of links $t$ and $u$ respectively, with a bolt on the side of their securing point on the respective chain, for instance the securing bolt of the adjacent colter or share. As shown in the drawing, the shares and colters are respectively carried by V-shaped members, one shank of which forms the said arm $y$ while the other shank carries or forms the share or colter, said members being pivoted at their intermediate parts to the chain.

The plow-system works a belt or width of ground just as broad as the whole length of the systems, the size of said belt being dependent on the amount of motive power, which is deemed suitable to be used. When the apparatus has reached the end of the field, the plow systems are hoisted, and the apparatus is moved so much that the next belt of ground to be worked adjoins the belt first plowed.

The wheels in each system are connected to each other by being journaled in a common frame and each system being rotatable in a vertical plane around its driving shaft is supported at its outer end, for instance, by adjustable lifting devices $v$ on the motor $a$, by means of which devices the systems may be raised and lowered to a proper height, and hoisted clear when the motor changes its position. These devices do not, however, belong to this invention and for that reason they are not in detail shown on the drawing.

The frame of each system is provided with a guide $x$, in which the bolts $p$ and $s$ engage and slide.

What I claim is:

1. A power plow consisting of a number of plow shares carried by a belt and arranged in two or more series, the shares in each series being displaced laterally in relation to each other, and the foremost share of each series being shorter than the succeeding share or shares in the same series.

2. A power plow consisting of a number of plow shares carried by a belt and arranged in two or more series, the shares in each series being displaced laterally in relation to each other, and the foremost share of each series being shorter than the succeeding share or shares in the same series, each of the shares of one series being placed straight behind the corresponding share in the preceding series.

3. A power plow consisting of a number of plow shares respectively carried by V-shaped members pivoted at their middle portions to a belt, one shank of each of said members carrying a share and the other shank being movably connected with said belt at another point.

4. A power plow consisting of a number of plow shares pivotally secured to a belt and each provided with an arm connected with the pivot of the adjacent share by means of a link.

5. A power plow consisting of a number of plow shares pivotally secured to a belt, and each movably connected with the belt at another point, the shares being arranged in two or more series and the shares in each series being displaced laterally in relation to each other, and the foremost share of each series being shorter than the succeeding share or shares in the same series.

In testimony that I claim the foregoing as my invention, I have signed my name in presence of two subscribing witnesses.

CARL ARVID ANDERSSON.

Witnesses:
 GUST. LINDHE,
 DAVID IVENSSON.